United States Patent
Gil et al.

(10) Patent No.: US 10,632,425 B2
(45) Date of Patent: Apr. 28, 2020

(54) COMPOSITION FOR INTERFACIAL POLYMERIZATION OF POLYAMIDE AND METHOD FOR MANUFACTURING REVERSE OSMOSIS MEMBRANE USING SAME

(71) Applicant: LG CHEM, LTD., Seoul (KR)

(72) Inventors: Hyungbae Gil, Daejeon (KR); Byungho Jeon, Daejeon (KR); Hyuin Ryu, Daejeon (KR); Yeji Kim, Daejeon (KR); Chong Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 257 days.

(21) Appl. No.: 15/749,478

(22) PCT Filed: Mar. 31, 2017

(86) PCT No.: PCT/KR2017/003556
§ 371 (c)(1),
(2) Date: Jan. 31, 2018

(87) PCT Pub. No.: WO2017/171474
PCT Pub. Date: Oct. 5, 2017

(65) Prior Publication Data
US 2018/0229189 A1    Aug. 16, 2018

(30) Foreign Application Priority Data

Mar. 31, 2016  (KR) .................. 10-2016-0039691
Mar. 31, 2016  (KR) .................. 10-2016-0039705

(51) Int. Cl.
*B01D 61/02*    (2006.01)
*B01D 67/00*    (2006.01)
(Continued)

(52) U.S. Cl.
CPC ......... *B01D 67/0006* (2013.01); *B01D 61/02* (2013.01); *B01D 61/025* (2013.01);
(Continued)

(58) Field of Classification Search
None
See application file for complete search history.

(56) References Cited

U.S. PATENT DOCUMENTS 8,691,905 B2   4/2014   Miltner et al.
8,925,738 B2   1/2015   Kim et al.
(Continued)

FOREIGN PATENT DOCUMENTS

CN    1550254      12/2004
CN    101524626     9/2009
(Continued)

OTHER PUBLICATIONS

Therien-Aubin et al., "Antifouling Polymer Coating for Reverse Osmosis Membrane," Polymer Preprints 51(1): 377-378 (2010).
(Continued)

*Primary Examiner* — Bradley R Spies
(74) *Attorney, Agent, or Firm* — Dentons US LLP

(57) ABSTRACT

The present specification provides a composition for interfacial polymerization of polyamide including at least one of an amine compound and an acyl halide compound; a surfactant; and a compound represented by Chemical Formula 1, and a method for preparing a reverse osmosis membrane using the same.

14 Claims, 1 Drawing Sheet

(51) Int. Cl.
*B01D 69/10* (2006.01)
*B01D 69/12* (2006.01)
*B01D 71/32* (2006.01)
*B01D 71/56* (2006.01)
*C08G 69/00* (2006.01)
*B01D 71/58* (2006.01)
*C02F 1/44* (2006.01)
*C08G 69/18* (2006.01)
*C08J 5/22* (2006.01)
*C08L 77/00* (2006.01)

(52) U.S. Cl.
CPC ............ *B01D 67/00* (2013.01); *B01D 69/10* (2013.01); *B01D 69/125* (2013.01); *B01D 71/32* (2013.01); *B01D 71/56* (2013.01); *B01D 71/58* (2013.01); *C02F 1/44* (2013.01); *C02F 1/441* (2013.01); *C08G 69/00* (2013.01); *C08G 69/18* (2013.01); *C08J 5/22* (2013.01); *C08L 77/00* (2013.01); *C02F 2303/20* (2013.01)

(56) References Cited

U.S. PATENT DOCUMENTS

| | | |
|---|---|---|
| 9,139,732 B2 | 9/2015 | Miltner et al. |
| 9,649,597 B2 | 5/2017 | Lee et al. |
| 2004/0222146 A1 | 11/2004 | Hirose et al. |
| 2013/0018136 A1 | 1/2013 | Miltner et al. |
| 2014/0224728 A1 | 8/2014 | Kim et al. |
| 2014/0246085 A1 | 9/2014 | Kwon et al. |
| 2017/0120201 A1 | 5/2017 | Shimura et al. |

FOREIGN PATENT DOCUMENTS

| | | |
|---|---|---|
| CN | 103917288 | 7/2014 |
| CN | 103946324 | 7/2014 |
| CN | 104023830 | 9/2014 |
| EP | 0015149 A1 | 9/1980 |
| EP | 2140929 | 1/2010 |
| EP | 2929928 | 10/2015 |
| JP | 4500002 | 7/2010 |
| JP | 2013522437 | 6/2013 |
| KR | 10-1999-0019008 | 3/1999 |
| KR | 10-2004-0095185 | 11/2004 |
| KR | 10-2010-0003799 | 1/2010 |
| KR | 10-2010-0078822 | 7/2010 |
| KR | 10-2012-0022414 | 3/2012 |
| KR | 10-2014-0058325 | 5/2014 |
| KR | 10-2014-0070457 | 6/2014 |
| WO | 2016002819 | 1/2016 |

OTHER PUBLICATIONS

Ou et al., Quick check manual on the properties and selection of plastic additives, First Edition, National Defense Industry Press; (2012); p. 444.

Golden Valley, Surfactant Chemistry, Second Edition, University of Science and Technology of China; (2013); p. 257-259.

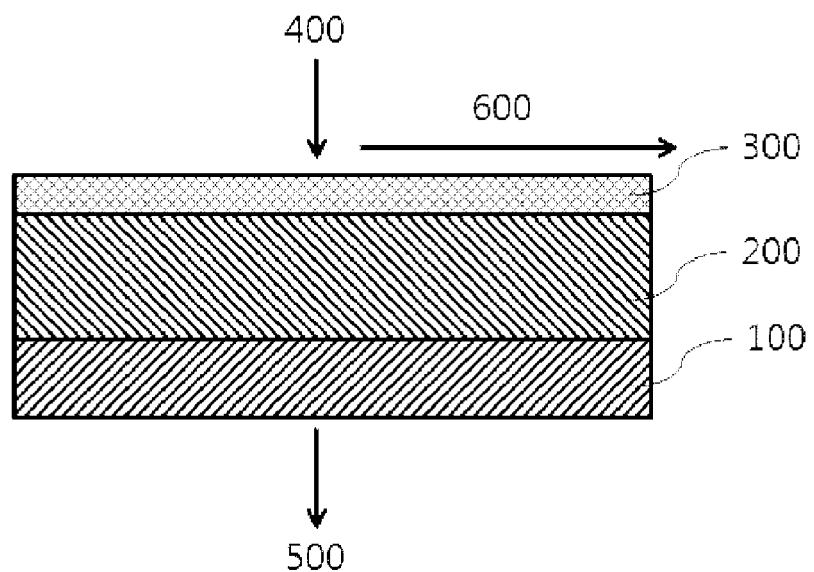

COMPOSITION FOR INTERFACIAL POLYMERIZATION OF POLYAMIDE AND METHOD FOR MANUFACTURING REVERSE OSMOSIS MEMBRANE USING SAME

TECHNICAL FIELD

This application is a National Stage Application of International Application No. PCT/KR2017/003556 filed on Mar. 31, 2017, which claims priority to and the benefit of Korean Patent Application Nos. 10-2016-0039705 and 10-2016-0039691 filed with the Korean Intellectual Property Office on Mar. 31, 2016, all of which are incorporated herein in their entirety by reference for all purposes as if fully set forth herein.

The present specification relates to a composition for interfacial polymerization of polyamide and a reverse osmosis membrane using the same.

BACKGROUND ART

Between two solutions separated by a semipermeable membrane, the solvent moving from the solution with a low solute concentration to the solution with a high solute concentration by passing through the membrane is referred to as osmosis, and herein, the pressure applied to the solution with a high solute concentration caused by the solvent migration is referred to as an osmotic pressure. However, when applying an external pressure higher than an osmotic pressure, the solvent migrates to the solution with a low solute concentration, and this phenomenon is referred to as reverse osmosis. Using a reverse osmosis principle and with a pressure gradient as a driving power, various salts or organic materials may be separated through a semipermeable membrane. A water-treatment membrane using such a reverse osmosis phenomenon separates molecular-level materials and removes salts from salt water or sea water, and is used to supply water for domestic use, construction, and industrial use.

Typical examples of such a water-treatment membrane may include a polyamide-based water-treatment membrane, and the polyamide-based water-treatment membrane is manufactured using a method of forming a polyamide active layer on a microporous support layer, and more specifically, is manufactured using a method of forming a microporous support by forming a polysulfone layer on a nonwoven fabric, forming a mPD layer by immersing this microporous support into an aqueous m-phenylenediamine (mPD) solution, and forming a polyamide layer through interfacial polymerization by immersing this again in a trimesoyl chloride (TMC) organic solvent to bring the mPD layer into contact with the TMC.

Flux and salt rejection are used as important indexes representing membrane performance in the water-treatment membrane.

DISCLOSURE

Technical Problem

The present specification is directed to providing a composition for interfacial polymerization of polyamide and a method for preparing a reverse osmosis membrane using the same.

Technical Solution

One embodiment of the present specification provides a composition for interfacial polymerization of polyamide including at least one of an amine compound and an acyl halide compound; a surfactant; and a compound represented by the following Chemical Formula 1.

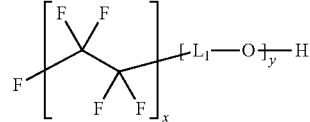

[Chemical Formula 1]

In Chemical Formula 1, x and y are the same as or different from each other, and each independently an integer of 1 to 30, a ratio of x and y is from 1:1 to 1:3, and $L_1$ is a linear or branched alkylene group.

Another embodiment of the present specification provides a method for preparing a reverse osmosis membrane including forming a polyamide active layer on a support using the composition for interfacial polymerization of polyamide.

Still another embodiment of the present specification provides a reverse osmosis membrane prepared using the method for manufacturing a reverse osmosis membrane.

Yet another embodiment of the present specification provides a water-treatment module including the reverse osmosis membrane.

Advantageous Effects

A reverse osmosis membrane prepared using a preparation method according to one embodiment of the present specification has excellent flux and salt rejection. In addition, when preparing a reverse osmosis membrane according to one embodiment of the present specification, coatability is enhanced by using a fluorocarbon series compound with a surfactant during interfacial polymerization, and as a result, a reverse osmosis membrane having a wider effective membrane area, which means an area actually experiencing reverse osmosis in the whole reverse osmosis membrane region, and having a smaller performance deviation can be prepared.

DESCRIPTION OF DRAWINGS

FIG. 1 illustrates a reverse osmosis membrane according to one embodiment of the present specification.

REFERENCE NUMERAL

100: Nonwoven Fabric
200: Porous Support Layer
300: Polyamide Active Layer
400: Salt Water
500: Purified Water
600: Concentrated Water

MODE FOR DISCLOSURE

Hereinafter, the present specification will be described in more detail.

In the present specification, a description of a certain member being placed "on" another member includes not only a case of the certain member adjoining the another member but a case of still another member being present between the two members.

In the present specification, a description of a certain part "including" certain constituents means capable of further including other constituents, and does not exclude other constituents unless particularly stated on the contrary.

One embodiment of the present specification provides a composition for interfacial polymerization of polyamide including at least one of an amine compound and an acyl halide compound; a surfactant; and a compound represented by the following Chemical Formula 1.

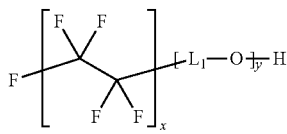

[Chemical Formula 1]

In Chemical Formula 1, x and y are the same as or different from each other, and each independently an integer of 0 to 30, a ratio of x and y is from 1:1 to 1:3, and $L_1$ is a linear or branched alkylene group.

In one embodiment, $L_1$ of Chemical Formula 1 is a linear alkylene group.

In one embodiment, $L_1$ of Chemical Formula 1 is an ethylene group.

In one embodiment of the present specification, x is an integer of 0 to 6. More preferably, x is an integer of 1 to 6.

In one embodiment of the present specification, y is an integer of 0 to 15. More preferably, y is an integer of 1 to 15.

In one embodiment of the present disclosure, a ratio of x and y is from 1:1 to 1:2.5.

In one embodiment of the present disclosure, the composition for interfacial polymerization of polyamide including the compound represented by Chemical Formula 1 has reduced surface tension. Accordingly, when forming a polyamide active layer on a support using the composition for interfacial polymerization of polyamide, coatability for the support surface is enhanced uniformly forming the polyamide active layer, and as a result, a reverse osmosis membrane having a smaller surface performance deviation may be prepared.

In one embodiment of the present specification, commercially-available materials may be used as the compound represented by Chemical Formula 1, and examples thereof may include, but are not limited to, Zonyl® FSO-100, FS-300, FSN and the like manufactured by DuPont.

In one embodiment of the present specification, the content of the compound represented by Chemical Formula 1 may be greater than 0% by weight and less than or equal to 0.1% by weight with respect to 100% by weight of the whole composition for interfacial polymerization of polyamide. In one embodiment, the compound represented by Chemical Formula 1 may be included in 0.001% by weight to 0.06% by weight in the composition for interfacial polymerization of polyamide. In another embodiment, the compound represented by Chemical Formula 1 may be included in 0.002% by weight to 0.01% by weight in the composition for interfacial polymerization of polyamide.

When the content of the compound represented by Chemical Formula 1 satisfies the above-mentioned range, the compound represented by Chemical Formula 1 lowers surface tension of the composition for interfacial polymerization of polyamide enabling even interfacial polymerization on the support, and as a result, a uniform active layer may be formed.

In one embodiment, when the composition for interfacial polymerization of polyamide only includes sodium lauryl sulphate (SLS) as a surfactant without including the compound represented by Chemical Formula 1, surface tension is measured to be 32.4 mN/m, however, when the compound represented by Chemical Formula 1 is included in 0.0025% together with the surfactant, surface tension decreases to 27.8 mN/m. As a result, m-phenylenediamine (mPD) uniformly remains across the support layer.

In one embodiment of the present specification, the surfactant may be represented by the following Chemical Formula 2.

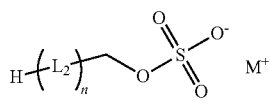

[Chemical Formula 2]

In Chemical Formula 2, n is an integer of 0 to 10, $L_2$ is a linear or branched alkylene group, and $M^+$ is any one selected from the group consisting of $Li^+$, $Na^+$ and $K^+$.

In one embodiment, $L_2$ of Chemical Formula 2 is a linear alkylene group.

In one embodiment, $L_2$ of Chemical Formula 2 is an ethylene group.

In one embodiment, sodium lauryl sulphate (SLS) may be used as the surfactant.

In one embodiment of the present specification, the content of the surfactant may be greater than 0% by weight and less than or equal to 0.1% by weight with respect to 100% by weight of the whole composition for interfacial polymerization of polyamide. In one embodiment, the content of the surfactant may be from 0.001% by weight to 0.1% by weight with respect to 100% by weight of the whole composition for interfacial polymerization of polyamide.

Particularly, when using sodium lauryl sulphate (SLS) as the surfactant, formation of a polyamide active layer is not inhibited even when introducing the SLS in excess since SLS is well-dissolved in water with its high hydrophile-lipophile balance (HLB) and has a high critical micelle concentration (CMC). Generally, SLS is used in an aqueous solution layer in a concentration of greater than 0% by weight and less than or equal to 0.1% by weight based on 100% by weight of the whole composition for interfacial polymerization of polyamide.

During the interfacial polymerization of the polyamide active layer, polyamide is quickly formed at an interface of an aqueous solution layer and an organic solution layer, and herein, the surfactant makes the layer thin and uniform and allows uniform polyamide active layer formation by m-phenylenediamine (mPD) present in the aqueous solution layer readily migrating to the organic solution layer.

In one embodiment of the present disclosure, the composition for interfacial polymerization of polyamide may include at least one of an amine compound and an acyl halide compound; the surfactant; and the compound represented by Chemical Formula 1. In one embodiment, the compound represented by Chemical Formula 1 may be included in greater than 0% by weight and less than or equal to 0.1% by weight, preferably in 0.001% by weight to 0.06% by weight, and more preferably in 0.002% by weight to 0.01% by weight in the composition for interfacial polymerization of polyamide based on 100% by weight of the whole composition.

In one embodiment of the present specification, the amine compound is consists of an aromatic amine compound, and the aromatic amine compound may include a compound represented by the following Chemical Formula 3.

[Chemical Formula 3]

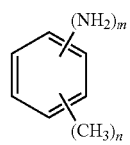

In Chemical Formula 3, n is an integer of 1 to 3, and m is an integer of 1 or 2.

In Chemical Formula 3, a methyl group bonds to a benzene ring of the aromatic amine compound, and the methyl group performs a role of lowering packing efficiency of the polyamide active layer formed through interfacial polymerization. This increases a free volume of the polyamide active layer, and therefore, flux may be enhanced when preparing a reverse osmosis membrane using the composition for interfacial polymerization of polyamide including the compound represented by Chemical Formula 3 as the amine compound.

According to one embodiment of the present specification, n of Chemical Formula 3 is 1.

According to one embodiment of the present specification, n of Chemical Formula 3 is 2.

According to one embodiment of the present specification, n of Chemical Formula 3 is 3.

According to one embodiment of the present specification, m of Chemical Formula 3 is 1.

According to one embodiment of the present specification, m of Chemical Formula 3 is 2.

According to one embodiment of the present specification, the amine compound is consists of an aromatic amine compound, and specifically, does not include an aliphatic amine compound participating as a monomer in the interfacial polymerization.

According to one embodiment of the present specification, the amine compound may further include one or more types selected from the group consisting of m-phenylenediamine, p-phenylenediamine, 1,3,6-benzenetriamine, 4-chloro-1,3-phenylenediamine, 6-chloro-1,3-phenylenediamine and 3-chloro-1,4-phenylenediamine. Specifically, according to one embodiment of the present specification, the amine compound is preferably m-phenylenediamine.

According to one embodiment of the present specification, the compound represented by Chemical Formula 3 may include one or more types selected from the group consisting of 2,3-diaminotoluene, 2,4-diaminotoluene, 2,5-diaminotoluene, 2,6-diaminotoluene, 3,4-diaminotoluene, 2,4,6-trimethyl-m-phenylenediamine, m-toluidine, p-toluidine, o-toluidine, 2,3-dimethylaniline, 2,4-dimethylaniline, 2,5-dimethylaniline and 2,6-dimethylaniline.

According to one embodiment of the present specification, the composition for interfacial polymerization of polyamide may be an aqueous solution including the amine compound; the surfactant; and the compound represented by Chemical Formula 1.

According to one embodiment of the present specification, the rest other than the amine compound; the surfactant; and the compound represented by Chemical Formula 1 in the composition for interfacial polymerization of polyamide may all be water.

According to one embodiment of the present specification, the content of the amine compound may be from 0% by weight to 5% by weight with respect to the aqueous solution. Specifically, according to one embodiment of the present specification, the content of the amine compound is more preferably from 0% by weight to 4% by weight with respect to the aqueous solution. When the content of the amine compound satisfies the above-mentioned range, a result of enhancing flux may be obtained when introducing the compound represented by Chemical Formula 3.

According to one embodiment of the present specification, the composition for interfacial polymerization of polyamide may be an aqueous solution including the amine compound including the compound represented by Chemical Formula 3; the surfactant; and the compound represented by Chemical Formula 1.

According to one embodiment of the present specification, the content of the compound represented by Chemical Formula 3 may be from 0.1% by weight to 5% by weight with respect to the aqueous solution. Specifically, according to one embodiment of the present specification, the content of the compound represented by Chemical Formula 3 is more preferably from 0.5% by weight to 4% by weight with respect to the aqueous solution.

According to one embodiment of the present specification, when the compound represented by Chemical Formula 3 is included in 0.5% by weight to 4% by weight with respect to the aqueous solution, flux may be enhanced when preparing a reverse osmosis membrane compared to when the compound represented by Chemical Formula 3 is not used.

According to one embodiment of the present specification, the composition for interfacial polymerization of polyamide may be an organic solution including the acyl halide compound; the surfactant; and the compound represented by Chemical Formula 1.

According to one embodiment of the present specification, the rest other than the acyl halide compound; the surfactant; and the compound represented by Chemical Formula 1 in the composition for interfacial polymerization of polyamide may all be an organic solvent.

The acyl halide compound is not limited as long as it is capable of being used for polyamide polymerization, and aromatic compounds having 2 to 3 carboxylic acid halides, for example, mixtures of one, two or more types selected from the group consisting of trimesoyl chloride, isophthaloyl chloride and terephthaloyl chloride may be preferably used. The content of the acyl halide compound may be from 0.05% by weight to 1% by weight with respect to 100% by weight of the organic solution.

As the organic solvent included in the organic solution, aliphatic hydrocarbon solvents, for example, hydrophobic liquids that are not mixed with water such as Freon, hexane, cyclohexane, heptane and alkane having 5 to 12 carbon atoms may be used. Specifically, alkane having 5 to 12 carbon atoms, and IsoPar (Exxon), ISOL-C (SK Chem.) and ISOL-G (Exxon) that are mixture thereof, and the like, may be used, however, the organic solvent is not limited thereto.

One embodiment of the present specification provides a method for preparing a reverse osmosis membrane including forming a polyamide active layer on a support using the composition for interfacial polymerization of polyamide described above.

In one embodiment of the present specification, the composition for interfacial polymerization of polyamide includes the amine compound, the surfactant and the compound represented by Chemical Formula 1, and the polyamide active layer is formed through interfacial polymerization by bringing the composition for interfacial polymerization of polyamide into contact with the acyl halide compound.

In another embodiment, the composition for interfacial polymerization of polyamide includes the acyl halide compound, the surfactant and the compound represented by Chemical Formula 1, and the polyamide active layer is formed through interfacial polymerization by bringing the composition for interfacial polymerization of polyamide into contact with the amine compound.

In the preparation method, when the amine compound and the acyl halide compound are brought into contact with other, the amine compound and the acyl halide compound produce polyamide through interfacial polymerization while reacting, and the result is adsorbed to a microporous support to form a thin film. Herein, the compound represented by Chemical Formula 1 lowers surface tension of the composition to have the interfacial polymerization evenly occur on the support surface, and therefore, a uniform reverse osmosis membrane may be prepared by the present disclosure. The contact may form the polyamide active layer through methods such as immersion, spray or coating.

Before bringing the amine compound into contact with the acyl halide compound, the preparation method may further go through a step of removing an excess aqueous solution including the amine compound as necessary. When the aqueous solution including the amine compound formed on the support is present too much, the composition in the aqueous solution may be non-uniform, and when the composition in the aqueous solution is non-uniform, a non-uniform polyamide active layer may be formed by interfacial polymerization thereafter. Accordingly, an excess aqueous solution is preferably removed after forming an amine aqueous solution layer on the support. The excess aqueous solution removal is not particularly limited, and, for example, a sponge, an air knife, nitrogen gas blowing, natural drying, a press roll or the like may be used for the removal.

In the present disclosure, conditions known in the art may be used as the interfacial polymerization condition.

The method of forming a polyamide active layer on the support is not particularly limited. For example, methods of spraying, coating, immersion, dropping and the like may be used.

One embodiment of the present specification provides a method for preparing a reverse osmosis membrane including preparing a support; and forming a polyamide active layer on the support using the composition for interfacial polymerization of polyamide described above.

In one embodiment of the present specification, those that are porous may be used as the support. In one embodiment, nonwoven fabrics generally used in the art may be used as the support, and types, thicknesses or the degree of porosity of the nonwoven fabric may vary as necessary.

Specifically, in another embodiment, those forming a coating layer made of polymer materials on a nonwoven fabric may be used as the support. Examples of the polymer material may include polysulfone, polyether sulfone, polycarbonate, polyethylene oxide, polyimide, polyether imide, polyetheretherketone, polypropylene, polymethylpentene, polymethyl chloride, polyvinylidene fluoride and the like, but are not limited thereto. In one embodiment, polysulfone may be used as the polymer material.

In addition, according to one embodiment of the present specification, the support may have a thickness of 60 μm to 100 μm, however, the thickness is not limited thereto and may be adjusted as necessary. In addition, the support preferably has pore sizes of 1 nm to 500 nm, however, the pore size is not limited thereto.

One embodiment of the present specification provides a reverse osmosis membrane including a support; and a polyamide active layer provided on the support, and having a flux deviation of 1 GFD or less. In one embodiment, the reverse osmosis membrane has a flux deviation of 0.9 GFD or less. In another embodiment, the reverse osmosis membrane has a flux deviation of 0.5 GFD or less.

Another embodiment of the present specification provides a reverse osmosis membrane including a support; and a polyamide active layer provided on the support, and having a salt rejection deviation of 2% or less. In one embodiment, the reverse osmosis membrane has a salt rejection deviation of 0.1% or less. In another embodiment, the reverse osmosis membrane has a salt rejection deviation of 0.05% or less.

One embodiment of the present specification provides a reverse osmosis membrane including a support; and a polyamide active layer provided on the support, and having a flux deviation of 1 GFD or less and a salt rejection deviation of 2% or less.

In the reverse osmosis membrane prepared using the composition for interfacial polymerization of polyamide of the present disclosure, the polyamide layer is uniformly formed, and, when collecting a sample of the reverse osmosis membrane and measuring salt rejection and flux at different points, the deviation is low. Specifically, uniformity of the reverse osmosis membrane may be identified using rhodamine, a trace dye used for determining flux and direction of a solution. The "deviation" is obtained through evaluating salt rejection and flux of two reverse osmosis membrane coupons using the same composition, and then calculating the standard deviation.

Another embodiment of the present specification provides a reverse osmosis membrane prepared using the methods for preparing a reverse osmosis membrane according to the embodiments described above. This reverse osmosis membrane includes a support; and a polyamide active layer provided on the support, wherein the polyamide active layer is formed using a composition for interfacial polymerization of polyamide including at least one of an amine compound and an acyl halide compound; a surfactant; and the compound represented by Chemical Formula 1.

The compound represented by Chemical Formula 1 and the surfactant may be included in a composition including the amine compound, for example, in an aqueous solution layer composition, or in a composition including the acyl halide compound, for example, in an organic layer composition. The compound represented by Chemical Formula 1 and the surfactant are preferably included in the aqueous solution layer.

The reverse osmosis membrane described above may further include additional layers as necessary. For example, the reverse osmosis membrane may further include an anti-fouling layer provided on the polyamide active layer.

One embodiment of the present disclosure provides a water-treatment module including at least one or more of the reverse osmosis membranes described above.

Specific types of the water-treatment module are not particularly limited, and examples thereof may include a plate & frame module, a tubular module, a hollow & fiber module, a spiral wound module or the like. In addition, as long as the water-treatment module includes the reverse osmosis membrane according to one embodiment of the present disclosure described above, the water-treatment module is not particularly limited in other constitutions and manufacturing methods, and general means known in the art may be employed without limit.

Meanwhile, the water-treatment module according to one embodiment of the present specification has excellent salt rejection and flux, and, by using a reverse osmosis membrane having a large effective membrane area, is useful in water-treatment systems such as household/industrial water-purification systems, sewage treatment systems or sea to fresh water treatment systems having a small performance deviation and enhanced uniformity.

Hereinafter, the present specification will be described in detail with reference to examples in order to specifically describe the present specification. However, examples according to the present specification may be modified to various different forms, and the scope of the present specification is not construed as being limited to the examples described below. The examples of the present specification are provided in order to more fully describe the present specification to those having average knowledge in the art.

EXPERIMENTAL EXAMPLE

In the present specification including the following examples and comparative examples, surface tension was measured using a Du Nouy ring method.

When introducing a ring made of platinum into a liquid and slowing pulling the ring, a contact angle ($\theta$) decreases. Surface tension may be obtained by the following Equation (1) through measuring the pulling force ($F_{max}$) when the contact angle becomes 0 ($\cos \theta = 1$), and the value is obtained after correction since properties of the liquid vary a little depending on temperature and density.

$$\sigma = \frac{F_{max} - F_v}{L \times \cos\theta} \quad \text{Equation (1)}$$

$F_{max}$: Pulling force when contact angle becomes 0 (total force)
$F_v$: Force due to liquid weight
L: Wetted length
$\theta$: Contact angle A cell evaluation device of a reverse osmosis membrane was formed using a flat permeable cell, a high pressure pump, a storage tank and a cooling device. The structure of the flat permeable cell was a cross-flow type and the effective area of the cell was 29.6 $cm^2$.

Before carrying out the experiments, reverse osmosis membranes were prepared using compositions for polyamide interfacial polymerization of Example 1 and Comparative Examples 1 to 3 shown in the following Table 1.

Example 1

An aqueous solution layer was formed on a support using a composition including m-phenylenediamine (mPD), sodium lauryl sulphate (SLS) as a surfactant, and Zonyl® FSO-100 as a compound represented by Chemical Formula 1. Subsequently, an organic layer was formed by coating a composition including trimesoyl chloride (TMC), 1,3,5-trimethylbenzene (TMB) and Isopar-G on the aqueous solution layer to perform interfacial polymerization, and as a result, a reverse osmosis membrane was prepared. Herein, the content of the mPD, the SLS and the FSO-100 in the composition for forming an aqueous solution layer was as listed in the following Table 1, and the rest was water.

Example 2

A reverse osmosis membrane was prepared in the same manner as in Example 1 except that 2,6-diaminotoluene (2,6-DAT), a compound represented by Chemical Formula 3, was used instead of mPD as the amine compound.

Comparative Example 1

A reverse osmosis membrane was prepared in the same manner as in Example 1 except that FSO-100, the compound represented by Chemical Formula 1, was not used in the aqueous solution layer of Example 1.

Comparative Example 2

A reverse osmosis membrane was prepared in the same manner as in Example 1 except that the aqueous solution layer of Example 1 further included polyvinyl pyrrolidone (PVP).

Comparative Example 3

A reverse osmosis membrane was prepared in the same manner as in Example 1 except that SLS, the surfactant, was not used in the aqueous solution layer of Example 1.

The reverse osmosis membrane prepared as above went through a stabilizing stage having a sufficient composite membrane consolidation effect by constantly maintaining an operating pressure. After that, the reverse osmosis membrane was stabilized for 30 minutes while passing distilled water through the reverse osmosis membrane until flux became constant.

For the membranes prepared in the examples and the comparative examples, salt rejection, flux and a deviation for each of these were evaluated, and the results are shown in the following Table 1. When evaluating the following flux and salt rejection, two reverse osmosis membrane coupons using the same composition were evaluated, and the standard deviation was obtained.

Measurement of Flux

Flux was measured by flowing down a 250 ppm NaCl solution for 60 minutes under a 60 psi condition until 40 mL to 50 mL permeated.

Measurement of Salt Rejection

Salt rejection was measured using a conductivity meter, and determined by the following Equation (2). This is due to the fact that an electrical conductivity value for a salt concentration is non-linear, and particularly, the deviation is not large at low salt rejection.

$$\text{Salt rejection} = \frac{C_{permeate}}{C_{feed}} \times 100 \quad \text{Equaiton (2)}$$

$C_{permeate}$: Concentration of produced water after passing through membrane
$C_{feed}$: Concentration of original water before passing through membrane

TABLE 1

| | Composition | Surface Tension (mN/m) | Salt Rejection (%) (Deviation) | Flux (GFD) (Deviation) |
|---|---|---|---|---|
| Example 1 | mPD 3 wt % + SLS 0.06 wt % + FSO-100 0.005 wt % | 27.8 | 94.09 (0.03) | 35.08 (0.87) |
| Example 2 | 2,6-DAT 3 wt % + SLS 0.06 wt % + FSO-100 0.005 wt % | 29.2 | 90.19 (1.71) | 40.63 (0.43) |
| Comparative Example 1 | mPD 3 wt % + SLS 0.06 wt % | 32.4 | 84.81 (10.31) | 36.78 (0.61) |
| Comparative Example 2 | mPD 3 wt % + SLS 0.06 wt % + PVP 0.0025 wt % + FSO-100 0.0025 wt % | 29.7 | 88.82 (4.49) | 33.82 (0.08) |
| Comparative Example 3 | mPD 3 wt % + FSO-100 0.06 wt % | 13.6 | 87.98 (0.07) | 21.96 (1.91) |

In Table 1, GFD, a flux unit, is defined as follows.

$$GFD = \frac{\text{Permeate volume (Gallon)}}{\text{membrane area (ft}^2\text{)} \times \text{day}}$$

As shown in Example 1 of Table 1, when preparing a reverse osmosis membrane using the compound represented by Chemical Formula 1 as a coatability enhancer together with a surfactant, a uniform reverse osmosis membrane having excellent salt rejection and also a significantly smaller salt rejection deviation while having a similar level of flux was obtained compared to Comparative Example 1 using only a surfactant, and Comparative Example 2 further including polyvinyl pyrrolidone (PVP) in addition to a surfactant and the compound represented by Chemical Formula 1.

In addition, in Comparative Example 3 using the compound represented by Chemical Formula 1 without a surfactant, surface tension was measured to be the lowest, however, it was seen that salt rejection and flux of the reverse osmosis membrane all significantly decreased.

In Example 2 using the compound represented by Chemical Formula 3 as an amine compound, a reverse osmosis membrane having both excellent salt rejection and flux was obtained compared to Comparative Examples 1 to 3.

Hereinbefore, preferred examples of the present disclosure have been described, however, the present disclosure is not limited thereto, and various modifications may be made within the scope of claims and detailed descriptions of the disclosure, and these also belong to the scope of the present disclosure.

The invention claimed is:

1. A composition, comprising:
   an amine compound;
   a surfactant; and
   a compound of Chemical Formula 1:

[Chemical Formula 1]

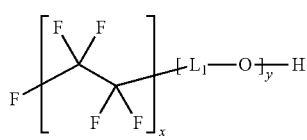

wherein, in Chemical Formula 1:
x and y are the same as or different from each other, and each independently an integer of 1 to 30;
a ratio of x and y is from 1:1 to 1:3; and
$L_1$ is a linear or branched alkylene group.

2. The composition for interfacial polymerization of polyamide of claim 1, wherein the surfactant is a compound of Chemical Formula 2:

[Chemical Formula 2]

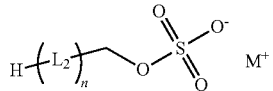

wherein in Chemical Formula 2:
$L_2$ is a linear or branched alkylene group;
n is an integer of from 0 to 10; and
$M^+$ is any one selected from the group consisting of $Li^+$, $Na^+$ and $K^+$.

3. The composition for interfacial polymerization of polyamide of claim 1, wherein the amine compound comprises an aromatic amine compound, and the aromatic amine compound includes a compound of Chemical Formula 3:

[Chemical Formula 3]

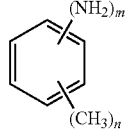

wherein in Chemical Formula 3:
n is an integer from 1 to 3; and
m is an integer from 1 or 2.

4. The composition for interfacial polymerization of polyamide of claim 3, wherein the aromatic amine compound further includes one or more types of amine selected from the group consisting of m-phenylenediamine, p-phenylenediamine, 1,3,6-benzenetriamine, 4-chloro-1,3-phenylenediamine, 6-chloro-1,3-phenylenediamine and 3-chloro-1,4-phenylenediamine.

5. The composition for interfacial polymerization of polyamide of claim 3, wherein the compound of Chemical Formula 3 includes one or more compounds selected from the group consisting of 2,3-diaminotoluene, 2,4-diaminotoluene, 2,5-diaminotoluene, 2,6-diaminotoluene, 3,4-diaminotoluene, 2,4,6-trimethyl-m-phenyl ene-diamine, m-toluidine, p-toluidine, o-toluidine, 2,3-dimethylaniline, 2,4-dimethylaniline, 2,5-dimethylaniline and 2,6-dimethylaniline.

6. The composition for interfacial polymerization of polyamide of claim 3, which is an aqueous solution, including,
   the amine compound including the compound of Chemical Formula 3;
   the surfactant; and
   the compound of Chemical Formula 1, wherein the compound of Chemical Formula 3 is present in an amount from 0.1% by weight to 5% by weight with respect to the aqueous solution.

7. The composition for interfacial polymerization of polyamide of claim 6, wherein the compound of Chemical Formula 3 is present in an amount from 0.5% by weight to 4% by weight with respect to the aqueous solution.

8. The composition for interfacial polymerization of polyamide of claim 1, wherein the compound of Chemical Formula 1 is present in an amount greater than 0% by weight and less than or equal to 0.1% by weight with respect to 100% by weight of the whole composition for interfacial polymerization of polyamide.

9. The composition for interfacial polymerization of polyamide of claim 1, wherein the surfactant is present in an amount greater than 0% by weight and less than or equal to 0.1% by weight with respect to 100% by weight of the whole composition for interfacial polymerization of polyamide.

10. A method for preparing a reverse osmosis membrane, comprising:
    forming a polyamide active layer on a support by reacting the composition for interfacial polymerization of polyamide of claim 1 with an acyl halide.

11. The method for preparing a reverse osmosis membrane of claim 10, wherein the composition for interfacial polymerization of polyamide includes the amine compound, the surfactant and the compound represented by Chemical Formula 1, and the polyamide active layer is formed through interfacial polymerization by bringing the composition for interfacial polymerization of polyamide into contact with the acyl halide compound.

12. A reverse osmosis membrane prepared using the preparation method of claim 10.

13. The reverse osmosis membrane of claim 12, further comprising an anti-fouling layer provided on the polyamide active layer.

14. A water-treatment module comprising the reverse osmosis membrane of claim 13.

\* \* \* \* \*